United States Patent
Abbott et al.

(10) Patent No.: US 6,762,396 B2
(45) Date of Patent: Jul. 13, 2004

(54) DEPOSITED RESISTIVE COATINGS

(75) Inventors: Richard C. Abbott, Gardner, MA (US); Gary P. Magnant, Rockport, MA (US); George Corey, Newton, MA (US); Ole Sandven, Salem, MA (US)

(73) Assignee: ThermoCeramiX, LLC, North Hampton, NH (US)

( * ) Notice: Subject to any disclaimer, the term of this patent is extended or adjusted under 35 U.S.C. 154(b) by 0 days.

(21) Appl. No.: 09/073,775

(22) Filed: May 6, 1998

(65) Prior Publication Data

US 2001/0003336 A1 Jun. 14, 2001

Related U.S. Application Data

(60) Provisional application No. 60/045,907, filed on May 6, 1997.

(51) Int. Cl.[7] .................................................. H05B 3/16
(52) U.S. Cl. .................. 219/543; 219/121.47; 219/535; 392/362; 118/724
(58) Field of Search ........................... 219/121.47, 543, 219/10.71, 535, 469, 390, 548, 470, 699, 471, 121.52, 553, 216, 505; 338/308, 22 R; 205/50; 313/582, 337; 392/362, 480, 481, 478, 435; 138/33, 145, 146, 528; 492/46; 359/698; 428/323; 118/724

(56) References Cited

U.S. PATENT DOCUMENTS

| | | | |
|---|---|---|---|
| 2,799,764 A | * 7/1957 | Chandler | 392/435 |
| 2,803,566 A | * 8/1957 | Smith-Johannsen | 428/323 |
| 3,425,864 A | 2/1969 | Morey | 117/215 |
| 3,697,728 A | * 10/1972 | Stirzenbecher | 219/548 |
| 3,906,276 A | * 9/1975 | Barraco et al. | 313/337 |
| 3,968,347 A | 7/1976 | Isoard | |
| 4,032,751 A | 6/1977 | Youtsey et al. | |
| 4,310,745 A | 1/1982 | Bender | |
| 4,388,522 A | 6/1983 | Boaz | 219/522 |
| 4,469,936 A | 9/1984 | Hunter | 219/543 |
| 4,485,297 A | * 11/1984 | Grise et al. | 219/528 |
| 4,498,071 A | 2/1985 | Plough, Jr. et al. | |
| 4,697,165 A | 9/1987 | Ishiguro et al. | |
| 4,720,716 A | 1/1988 | Ikeda et al. | 346/140 R |
| 4,724,305 A | 2/1988 | Iimura et al. | |
| 4,725,710 A | 2/1988 | Ramus et al. | 219/203 |
| 4,733,055 A | 3/1988 | Cunningham | 219/540 |
| 4,743,940 A | 5/1988 | Nagasaka et al. | 355/3 FU |
| 4,776,070 A | 10/1988 | Shibata et al. | 29/130 |
| 4,808,490 A | 2/1989 | Tsukuda et al. | 428/699 |
| 4,813,372 A | 3/1989 | Kogure et al. | 118/60 |

(List continued on next page.)

FOREIGN PATENT DOCUMENTS

| | | |
|---|---|---|
| DE | 33 25 204 A1 | 1/1985 |
| GB | 924497 | 4/1963 |
| GB | 2 099 670 A | 12/1982 |
| GB | 2 135 160 A | 8/1984 |
| WO | WO 89/10471 A | 11/1989 |
| WO | WO 96/37763 | 11/1996 |
| WO | WO 97/03236 | 1/1997 |
| WO | WO 97/33300 | 9/1997 |

OTHER PUBLICATIONS

V.H. Pitt, "The Penguin Dictionary of Physics", Penguin Books LTD. Harmondsworth, Middlesex, England. See p. 194, right–hand column, paragraph 6.

Fasca, Chad, "Rapid Thermal Processing," *Electronic News*, pp. 35, 40 and 58 (1998).

*Primary Examiner*—Quang T. Van
(74) *Attorney, Agent, or Firm*—Hayes Soloway PC

(57) ABSTRACT

The present invention involves coatings deposited on a substrate including a layer having a selected resistivity. The resistive layer can serve as a heat source in a variety of applications and can be fabricated using an arc plasma spraying procedure.

38 Claims, 8 Drawing Sheets

U.S. PATENT DOCUMENTS

| | | | |
|---|---|---|---|
| 4,844,942 A | * 7/1989 | Koizumi et al. | 427/111 |
| 4,857,689 A | 8/1989 | Lee | 219/10.71 |
| 4,860,434 A | 8/1989 | Louison et al. | |
| 4,868,899 A | 9/1989 | Bard et al. | 219/543 |
| 4,870,388 A | 9/1989 | Sugata et al. | 338/308 |
| 4,889,974 A | 12/1989 | Auding et al. | 219/543 |
| 4,970,376 A | 11/1990 | Mellor et al. | 219/543 |
| 5,004,893 A | 4/1991 | Westover | 219/505 |
| 5,060,354 A | 10/1991 | Chizinsky | 29/25.02 |
| 5,155,336 A | 10/1992 | Gronet et al. | 219/411 |
| 5,198,634 A | 3/1993 | Mattson et al. | 219/121.43 |
| 5,252,807 A | 10/1993 | Chizinsky | 219/390 |
| 5,364,522 A | * 11/1994 | Wang | 205/50 |
| 5,408,070 A | 4/1995 | Hyllberg | 219/469 |
| 5,408,574 A | 4/1995 | Deevi et al. | 392/404 |
| 5,418,885 A | 5/1995 | Hauser et al. | 392/416 |
| 5,420,395 A | 5/1995 | Hyllberg et al. | 219/470 |
| 5,444,217 A | 8/1995 | Moore et al. | 219/405 |
| 5,468,936 A | * 11/1995 | Deevi et al. | 219/553 |
| 5,498,855 A | 3/1996 | Deevi et al. | 219/553 |
| 5,504,307 A | * 4/1996 | Hayashi et al. | 219/543 |
| 5,534,231 A | 7/1996 | Savas | 216/67 |
| 5,595,241 A | 1/1997 | Jelinek | 165/80.1 |
| 5,600,414 A | 2/1997 | Hyllberg | |
| 5,616,266 A | 4/1997 | Cooper | 219/543 |
| 5,624,591 A | 4/1997 | Di Trapani | 219/522 |
| 5,643,483 A | 7/1997 | Kubota et al. | |
| 5,643,839 A | 7/1997 | Takagi | 437/247 |
| 5,646,482 A | * 7/1997 | Suzuki et al. | 313/582 |
| 5,665,262 A | 9/1997 | Hajaligol et al. | |
| 5,702,811 A | * 12/1997 | Ho et al. | 428/323 |
| 5,724,187 A | * 3/1998 | Varaprasad et al. | 359/608 |
| 5,753,891 A | * 5/1998 | Iwata et al. | 219/390 |
| 5,822,675 A | 10/1998 | Paquet et al. | |
| 5,841,111 A | 11/1998 | Shea et al. | |
| 5,968,379 A | * 10/1999 | Zhao et al. | 219/121.52 |
| 6,049,064 A | * 4/2000 | Natsuhara et al. | 219/216 |

* cited by examiner

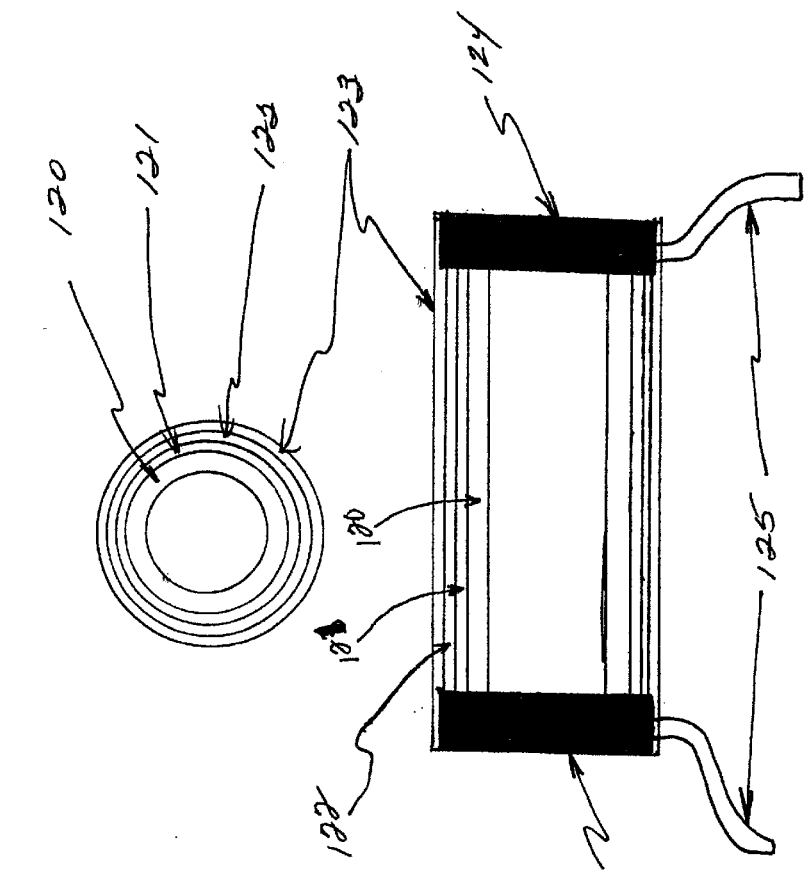
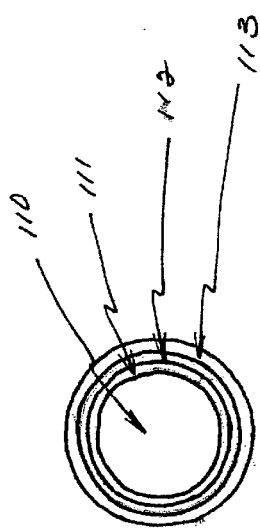
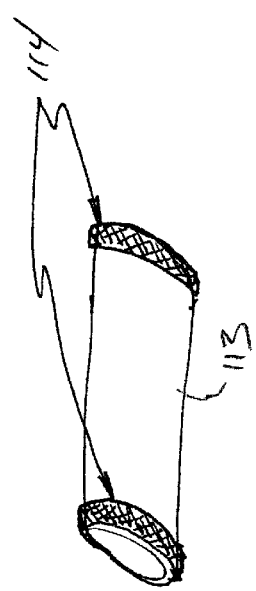
Figure 10
Figure 9a
Figure 9b

DEPOSITED RESISTIVE COATINGS

RELATED APPLICATIONS

This application claims the benefit of U.S. Provisional Application Serial No. 60/045,907 filed on May 6, 1997, the entire teachings of which are incorporated herein by reference.

BACKGROUND OF THE INVENTION

Arc plasma spraying is a method for depositing materials on various substrates. A DC electric arc creates an ionized gas (a plasma) which is used to literally spray molten powdered materials in a manner similar to spraying paint. It was first developed by the aerospace industry where a need existed for different high performance coatings that afforded better thermal protection, electrical insulation and mechanical wear resistance. The technology has since found many applications in other industries because the coatings are typically of high density, good adhesion, and relatively low cost. One of the major advantages of the method is that it is amenable to volume manufacturing. For example, plasma sprays have been used to manufacture millions of alternator parts per year with aluminum oxide.

Plasma spray is part of a larger class of technology called, thermal spray, which includes combustion and electronic arc methods for depositing metal and ceramic coatings.

A thermal sprayed coating has a unique microstructure. During the deposition process, each particle enters a gas stream, melts, and cools to the solid form independent of other particles. When molten particles impact the substrate being coated, they impact ("splat") as flattened circular platelets and freeze at high cooling rates. The coating is built up on the substrate by traversing the gun apparatus repeatedly over the substrate building up layer by layer until the desired thickness of coating has been achieved. Because the particles solidify as splats, the resultant microstructure is very lamellar with the grains approximating circular platelets randomly stacked above the plane of the substrate.

A continuing need exists for improvements, however, for improved materials in many fields using thermal spraying.

SUMMARY OF THE INVENTION

The present invention relates to the fabrication and use of resistive heaters with a controlled resistance such that when a voltage is applied to the material, heat is generated.

A heater of this invention includes a substrate and a resistive heating layer coated on the substrate. The resistive heating layer includes an electrically-insulating composition mixed with an electrically-conducting composition and a third composition. The electrically-insulating composition has a higher electrical resistance than the electrically-conducting composition.

In a preferred embodiment, the resistive heating layer has the distinctive microstructure of a thermal-sprayed coating and is electrically coupled to a voltage source. In a further preferred embodiment, the third material includes additive that enhances a material property of the resistive heating layer. In another preferred embodiment, the substrate, the electrically-insulating composition and the electrically-conducting composition are ceramic. In yet another preferred embodiment, the third material includes a conductive material or a thermal conductor. In other preferred embodiments, the heater includes a nozzle or a tubular body that heats material within the body.

In a method of this invention, an electrically-conducting composition is mixed with an electrically-insulating composition and a third material to form a mixture. The mixture is then thermal sprayed onto a substrate, and a heater is formed with the sprayed mixture.

In a preferred embodiment of this method, a bonding layer is formed between the substrate and the heater. In another preferred embodiment the substrate is removed from the thermal sprayed mixture. In yet another preferred embodiment, the third material includes a second electrical insulating layer. Still another preferred embodiment includes the formation of a heat reflecting layer. In a further preferred embodiment, a rapid thermal heater for a semiconductor processing system is formed. Additionally, a resistive heating layer is preferably formed that includes silicon carbide, molybdenum disilicide, lanthanum chromate, zirconium diboride or titanium diboride. In the thermal spraying step, a plurality of layers are preferably sprayed.

Another embodiment of this invention is a plasma-sprayed resistive heater including a resistive heating layer including a first electrically-insulating material mixed with a second electrically-conducting material which has a lower electrical resistance than the electrically-insulating material and further mixed with a third material. A voltage source is electrically coupled to the resistive heating layer. Preferably, the electrically-insulating material and the electrically conducting material are both ceramic.

Advantages of embodiments of this invention that have a resistive heating layer include the capability of quickly cycling between processing temperatures due to the extremely low mass of the resistive heating layer. Further, the design of the heater module affords extensive flexibility in heater configuration allowing the heater to be easily designed to include multiple zones of the resistive heating layer that can be independently powered to compensate for unequal heat losses between the center and edge of an article to be heated. Enhanced control over the composition of the resistive heating layer, in accordance with this invention, further provides greater latitude in heater design and greater control over the amount of heat generated.

BRIEF DESCRIPTION OF THE DRAWINGS

The foregoing and other objects, features and advantages of the invention will be apparent from the following, more particular description of preferred embodiments of the invention, as illustrated in the accompanying figures. The drawings are not necessarily to scale, emphasis instead being placed upon illustrating the principles of the invention.

FIG. 9a is an interior cross-sectional view of a chemically-resistant thermally-sprayed heater pipe for low to high temperature applications.

FIG. 9b is a perspective side view of the heater pipe shown in FIG. 9a.

FIG. 10 includes an interior cross-sectional view and a cross-sectional side view of a low-temperature heater on a metal or plastic pipe.

DETAILED DESCRIPTION OF PREFERRED EMBODIMENTS

Figure 1A:
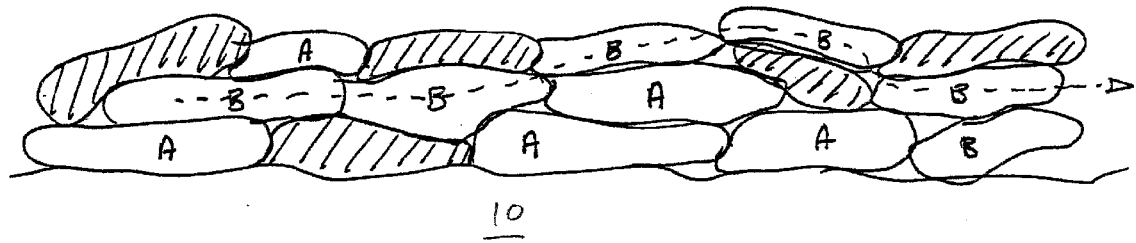
FIG. 1a is an illustration of deposited microstructure of this invention

The features and other details of the method of the invention will now be more particularly described with reference to the accompanying drawings and pointed out in the claims. Numbers that appear in more than one figure represent the same item. It will be understood that the particular embodiments of the invention are shown by way of illustration and not as limitations of the invention. The principle features of this invention can be employed in various embodiments without departing from the scope of the invention.

Resistive heating compositions can be deposited by arc plasma spray. When the compositions are to serve as a coating, the coatings typically have high bond strength with the substrate, ranging up to 10,000 psi in tension (normal to the plane of the coating) with shear strengths (parallel to the plane of the coating) four to eight times higher. Such strong adhesion often allows materials with dissimilar thermal expansion coefficients to reach elevated temperatures without delamination due to thermoelastic stresses. In addition, the intimate contact between coating and substrate permits excellent heat transfer across the coating/substrate interface. Preferably, the thermal spraying is performed in a vacuum to reduce surface defects in the sprayed coating.

A coating, in the form of a resistive heating layer of this invention, comprises at least one material, preferably a low-density ceramic that possesses the following qualities: an ability to withstand high temperatures, a resistance to oxidation, and a low mass for rapid temperature response to voltage inputs. The resistive heating layer is also highly refractory so that a fairly high power density is achievable.

A variety of carbides, borides, suicides, and oxides have electroconducting properties that are appropriate for use in this invention. In a preferred embodiment, the resistive heating layer is formed of either silicon carbide (SiC) or molybdenum disilicide ($MoSi_2$). Other suitable materials from which the resistive heating layer can be formed include lanthanum chromate, zirconium diboride ($ZrB_2$) and titanium diboride ($TiB_2$).

In another preferred embodiment, the resistive heating layer is composed of a mixture of at least two materials, one material being electroconductive (low resistivity) and the other material being insulating (high resistivity). The overall resistivity of the resistive heating layer is controlled by blending the materials prior to deposition in such proportions that, when they are deposited as a coating by, for example, arc plasma spraying, the desired resistivity is obtained.

The starting materials for forming the resistive heating layer can be mixed using one of several different techniques. For example, the materials can be mechanically blended, where the materials are mixed using conventional blending techniques. Another option is to use binders, where the powders are mixed with liquid binders, such as polyvinyl alcohol or polystyrene. The powders are then dried, crushed and sieved. The resultant powder contains the binder which burns off during the thermal spray process. A third option is spray drying, where the materials are mixed in a fine powder form with some liquid, usually water, then sprayed through a nozzle to form spherical agglomerates, which, on average, consist of particles having the desired composition.

If the starting powder consists of a blend of two or more different materials, the plasma sprayed coating microstructure will be a lamellar array of two or more kinds of grains. As shown in FIG. 1a, the two different materials can be viewed as forming two interpenetrating, interconnected lattices with the degree of interconnection being a function of the proportion of material that is present. In particular, if one material happens to be electrically insulating, and one electrically conducting, then the conductivity (or resistivity) will depend upon the degree of interconnectedness of the conducting material. In FIG. 1a, the deposited microstructure includes 3 discrete phases of different materials deposited on a substrate 10. Materials A and B are insulator and conductor, respectively. The cross-hatched phase is added for modified engineering properties, such as hardness, thermal emissivity, or thermal expansion. The dashed line indicates electric current path through the lattice.

Figure 1B:
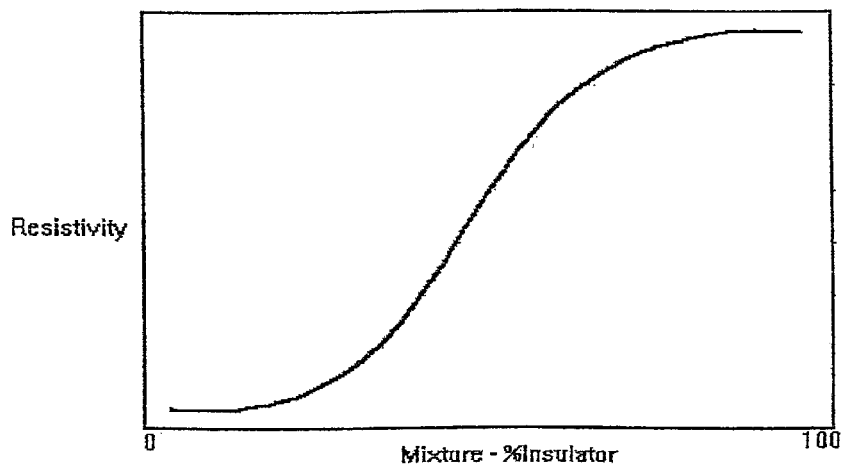
FIG. 1b is a graphical illustration of resistivity as a function of coating composition.

A general representation of the relationship between the balance of powder composition and resistivity is illustrated in FIG. 1b. The powder comprises an electroconducting material (represented on the left side of the graph as 0% insulator concentration) and an insulating material (represented on the right side of the graph as 100% insulator composition). The horizontal axis indicates the fraction of insulator blended into the composite. As is evident from the chart in FIG. 1b, a mixture of powders that has a high proportion of low resistivity material will have, when deposited as a coating by plasma spray, a low resistivity. Similarly, the same two materials blended with a large proportion of high resistivity material will have a correspondingly high resistivity as a plasma-sprayed coating.

For a deposited coating to use a desired power level to generate a particular amount of heat when a voltage is applied, the coating generally must have a particular resistance that is determined by the desired power level. The resistance, R, is calculated from the applied voltage, V, and the desired power level, P, as follows:

$$R=V^2/P$$

The resistance of the coating is a function of the geometry of the coating. Specifically, the resistance of the coating can be measured in terms of the electric current path length (L) the cross sectional area (A) through which the current passes, and the material resistivity ($\rho$) by the following equation:

$$R=\rho \cdot L/A$$

Therefore, to design a coating for a given power level and a given geometry that will operate at a given voltage, one has only to determine the resistivity of the material using the following equation:

$$\rho = R \cdot A/L = V^2 \cdot A/(P \cdot L)$$

A composition with the necessary resistivity, ρ, as determined, above, can be found empirically using varying blends of conductors and insulators.

The fact that the resistivity is a controlled variable is significant because it represents an additional degree of freedom for the heater designer that ordinarily does not exist. In most existing situations, the resistivity of the heater material, e.g., nichrome, is a fixed value, forcing the designer to develop a heater geometry, by manipulating L and A, to obtain the desired power.

For example, if it is desired to heat a tube by winding nichrome wire around it, the designer must choose the correct diameter wire for A, the cross sectional area through which the electric current must pass, and the spacing of the windings for L, the total path length of the electric current.

It is often problematic achieving this balance of ρ, L, and A simply because of the commercial availability of the desired wire size. If a coating is to be used, the L and A parameters are simply determined by the dimensions of the tube and the coating thickness. There is no limitation in ρ because that can be formulated in the starting powders.

The starting materials cover a very wide range of chemical compositions. This disclosure focuses on ceramics for the low resistivity material because in general they can withstand high temperatures, frequently possess good oxidation resistance, and often have low mass for rapid temperature response to voltage inputs. In addition, they have, in general, a good coefficient of thermal expansion match with the insulating component. Such electroconducting materials include carbides such as silicon carbide or boron carbide, borides, silicides such as molybdenum disilicide or tungsten disilicide, and oxides such as lanthanum chromate or tin oxide which have electroconducting properties that are appropriate for the technology. For the insulating material, oxides are very good in the application, particularly $Al_2O_3$, which is refractory, insulating, and inexpensive. Aluminum nitride and mullite are also suitable as insulating ceramics In a preferred embodiment, the resistive heating layer is a mixture of materials with positive and negative coefficients of resistivity which can cross compensate for each other over a range of temperatures. Examples of such mixtures include molybdenum disilicide ($MoSi_2$) and lanthanum chromate ($LaCrO_3$), where the resistivity of molybdenum disilicide will increase with temperature, and the resistivity of lanthanum chromate will decrease with temperature such that a combination of the two can provide fairly constant resistance over a range of temperatures. Another example of such a mixture includes titanium diboride ($TiB_2$) and silicon carbide (SiC).

In another preferred embodiment, resistive heaters, heated parts and resistive coatings comprise three or more materials (e.g., ceramics, metals, polymers, glasses cermets), at least two of which are ceramics, formed by thermal spray processes to enhance desirable engineering properties, including the following: thermal conductivity, resistivity range, emissivity, bonding, hardness, ductility, thermal expansion compatibility, porosity, chemical resistance (especially oxidation resistance, reduction resistance, or molten metal resistance), negative temperature coefficients (NTC) and positive temperature coefficients (PTC), self-regulating heating systems, decorative finish applications, catalytic properties, sintering, reflective properties, sensing capabilities, and filtering properties. All thermal spray processes can be used to make multi-phase resistive heaters.

For example, in a resistive coating including molybdenum disilicide and mullite, any of a variety of additives can be supplied to enhance various properties. Aluminum nitride, for example, is added to enhance thermal conductivity and temperature uniformity, and it is particularly useful in applications involving thermal cyclers or constrained geometries. Lanthanum chromate is added to expand the range of achievable resistivities of the coating and allows more precise determination of desired power density. Aluminum oxide is added to increase heater emissivity and is particularly useful in radiant heaters. Molybdenum is added to increase bonding of the resistive heating layer to the metallic or ceramic substrate. Silica or metals are added to modify the ductility, substrate compatability, interparticle cohesion and coefficient of thermal expansion (CTE) through low elastic modulus. Polystyrene is added and is oxidized to leave a porous heater structure particularly suitable for filters or membranes. Glass formers (e.g., silica), oxides, and precious metals are added for oxidation resistance. Platinum is added for catalytic conversion of hydrocarbons at elevated temperatures. Finally, silicon carbide or silicon nitride is added to modify resistivity.

In a resistive heating layer of titanium diboride and aluminum oxide, for example, other additives are also employed. For example, yttrium oxide is added as a sintering aid to densify a spray-formed nozzle/heater. Magnesium zirconate is added for molten metal resistance and is particularly useful in aluminum processing applications. Chromium-doped aluminum oxide (synthetic ruby) is added to provide color to the heater. Further, aluminum nitride is added to increase thermal conductivity.

In yet another example, in a resistive heating layer including zirconium diboride and aluminum oxide, chromium boride is added to increase the hardness and abrasion resistance of the heater and is particularly useful in the pumping of petroleum crude oil and abrasive slurries.

Moreover, materials which ordinarily can not be thermally-sprayed, such as silicon carbide, aluminum nitride, and silicon nitride can be deposited with carrier materials that melt. Further, structural enhancements to heater coatings or free standing parts can be accomplished by injecting ceramic fibers, for example, into the plasma stream. Winding filaments during heater deposition can also add strength.

Figure 2:
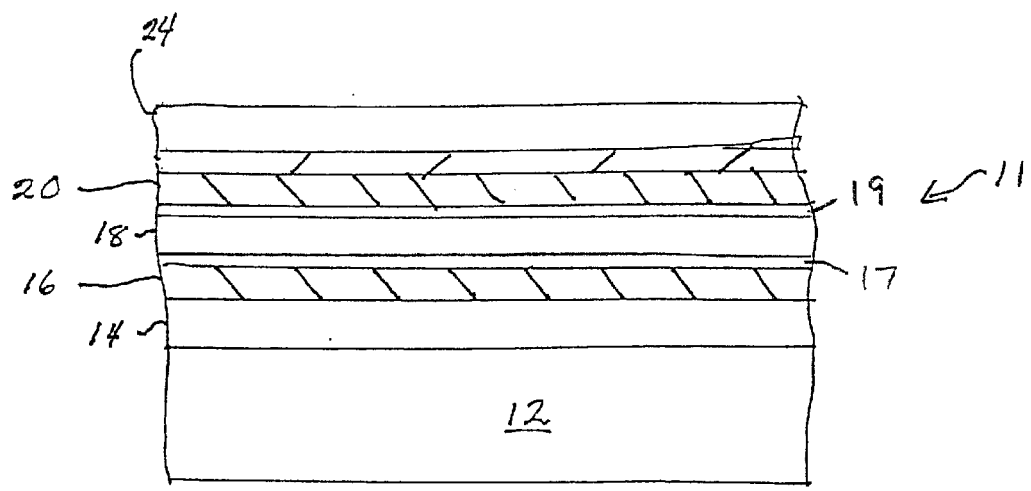
FIG. 2 illustrates a layered structure including an electrically resistive layer that was plasma sprayed onto a substrate in accordance with the invention.

The electrically resistive ceramic coatings can be configured in a variety of ways, depending on the application. In general, the path of conduction can be either through the thickness of the coating or through the length of the coating. If it is through the thickness of the coating, usually the ceramic is sprayed directly on the substrate or on a substrate which has been previously sprayed with a bond coat. Then a metal contact layer can be deposited on the top surface of the ceramic layer. An example of a multilayer structure 11 is illustrated in FIG. 2. In this structure a bonding layer 14 such as a nickel-aluminum alloy is formed on a substrate 12 such as a metal or carbon fiber element. Note that the surface of the substrate 12 can also be roughened, by grit blasting for example, to provide better adherence. Next an electrically insulating layer 16 such as aluminum oxide is formed. This is followed by the electrically resistive ceramic layer 18 sandwiched between electrical contact layers 17 and 19. Next, a second electrical insulating layer 20, which can also be a ceramic, is applied. A thermally insulating ceramic coating 24 such as zirconium dioxide is then applied. Emissive coatings, such as chromium oxide, can replace layers 20 and 24 in an alternative embodiment.

Figure 3:
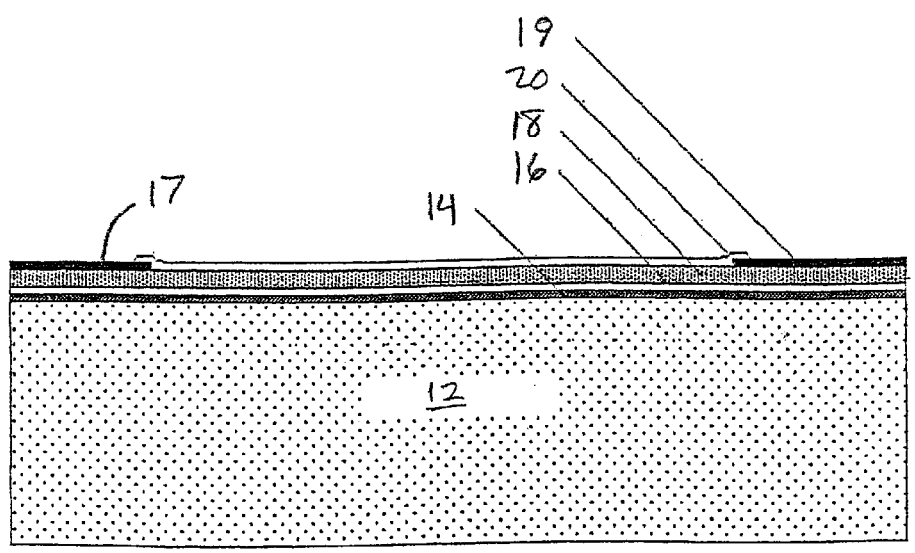
FIG. 3 is a cross-sectional view of an embodiment of this invention, wherein a resistive heating layer using lengthwise conduction is formed between insulating layers on a conductive substrate.

If electrical conduction is through the length of the coating, as in FIG. 3, then an insulating layer 16, such as aluminum oxide, can be deposited over the substrate 12 and bond coat 14 if the substrate 12 is a conductor so as to prevent shorting to the substrate 12. Likewise, a second insulating layer 20, preferably another ceramic, can be deposited on top of the resistive heating layer 18 to electrically isolate the resistive heating layer 18. Contact pads 17 and 19 provide lengthwise conduction through the resistive heating layer 18.

In another embodiment, the resistive heating layer 18, is deposited in a nonuniform pattern on the substrate 12. In a further preferred embodiment, the pattern includes a resistive heating layer 18 in the form of discrete and independently powered regions. These regions can be formed, for example, by deposition or spraying on a masked substrate. The independently-powered regions enable the heater to achieve precise temperature control and uniform temperatures across the wafer, thereby reducing thermal stress in the wafer. In one embodiment, the resistive heating layer 18 is denser or more highly concentrated at positions proximate to the edge of the wafer to provide more heat at the edges of the wafer to counteract the more rapid rate of heat loss that occurs at the edge of the wafer in comparison to the center of the wafer.

In other embodiments, the heater module also includes at least one other layer such as a conducting film, an additional resistive film, or a layer that can reflect or emit heat from the heater module in a selected pattern. One or more layers can also be included to provide improved thermal matching between components to prevent bending or fracture of adjacent layers having different coefficients of thermal expansion. In another preferred embodiment, a very rough surface is applied to the outer surface of the heater to improve heat transfer to the (nitrogen) gas media. The bond layer may be graduated in composition for a better match in coefficients of thermal expansion.

Other plasma-sprayed coatings may be deposited to effect different engineering purposes. For example, thermal barrier coatings such as $ZrO_2$ to thermally insulate the heater from either the top or bottom, or high thermal emissivity coatings such as $Cr_2O_3$ for efficient radiant heat transfer.

The composition of the outermost deposited surface of the heater is preferably selected according to the method of heat transfer being utilized. If the heat transfer to the wafer is principally radiative, then its outermost surface preferably comprises a material with high thermal emissivity. On the other hand, if heat is being transferred mainly by conduction, then a highly conductive surface is preferred. When heat is transferred by convection, the desired material is one whose heat transfer coefficient is most compatible with the gaseous medium.

Figure 4A:
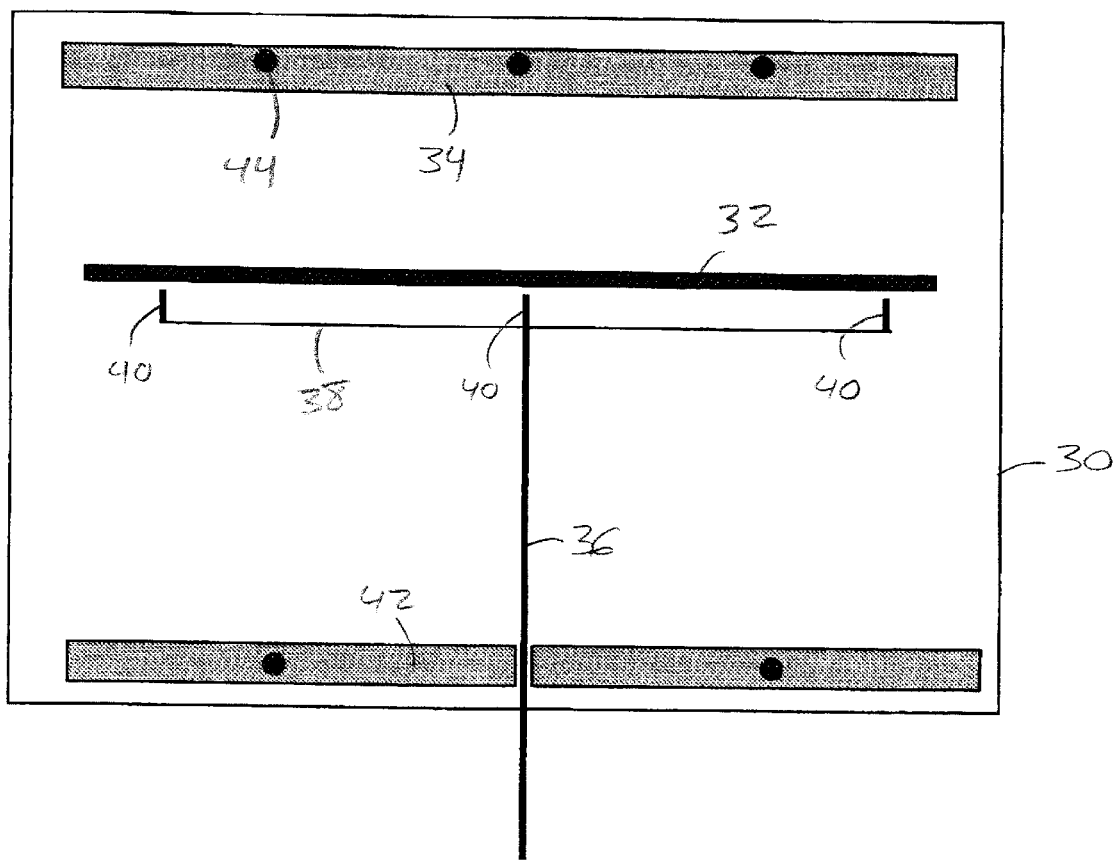
FIG. 4a is a cross-sectional view of a rapid thermal processing apparatus of this invention.

A rapid thermal processing system of this invention that uses one or more ceramic resistive heaters for the processing of semiconductor wafers is illustrated in FIG. 4a. An enclosure 30 defines a chamber for RTP. A semiconductor wafer 32 is supported by pins 40 upon a support plate 38 mounted on a pedestal 36, and is placed near or in direct contact with a ceramic heater 34. The wafer 32 can be raised, lowered, or rotated (to prevent more uniform heating) within the chamber by means of a drive mechanism connected with the pedestal 36. The support plate 38 is a round plate constructed of an insulating material, such as quartz or various other ceramics and it reflects much of the radiation emitted from the heated wafer 32. Three pins 40 are mounted on top face of the support plate 38. The pins are preferably formed of quartz, as well, and are pointed at their top ends to establish minimal contact with the wafer 32 which rests upon these pointed ends.

A second heater 42 is provided at the bottom of the chamber and is used for preheating a wafer 32 before processing by heater 34. In other embodiments, however, either heater 34 or 42 can be used to process the wafer 32. The wafer 32 is moved from heater 34 to heater 42 by the drive mechanism raising the pedestal 36. Thermocouples 44 are embedded within small-diameter wells in each of the heaters 34 and 42 to measure the temperature of the heaters. The temperature of the wafer 32 will approximate the temperature of a heater with which it is in close proximity or in contact.

In one embodiment, each heater is a multilayer ceramic device, such as those illustrated in FIGS. 2 and 3, with a resistive heating layer spray-coated on a thermally insulating substrate (e.g., aluminum oxide). Preferably, the thickness of the resistive heating layer is less than 0.25 inches. Each of the heaters 34, 42 are driven by a voltage source electrically coupled with the resistive heating layer. When the voltage source applies a voltage to the resistive heating layer, heat is generated. Optionally, additional layers are coated on the resistive heating layer in order, for example, to prevent a wafer from being contaminated by the heater or its substrate, to prevent adhesion of the wafer to the heater, or to create an emissive surface for a radiative ceramic heater.

Figure 4B:
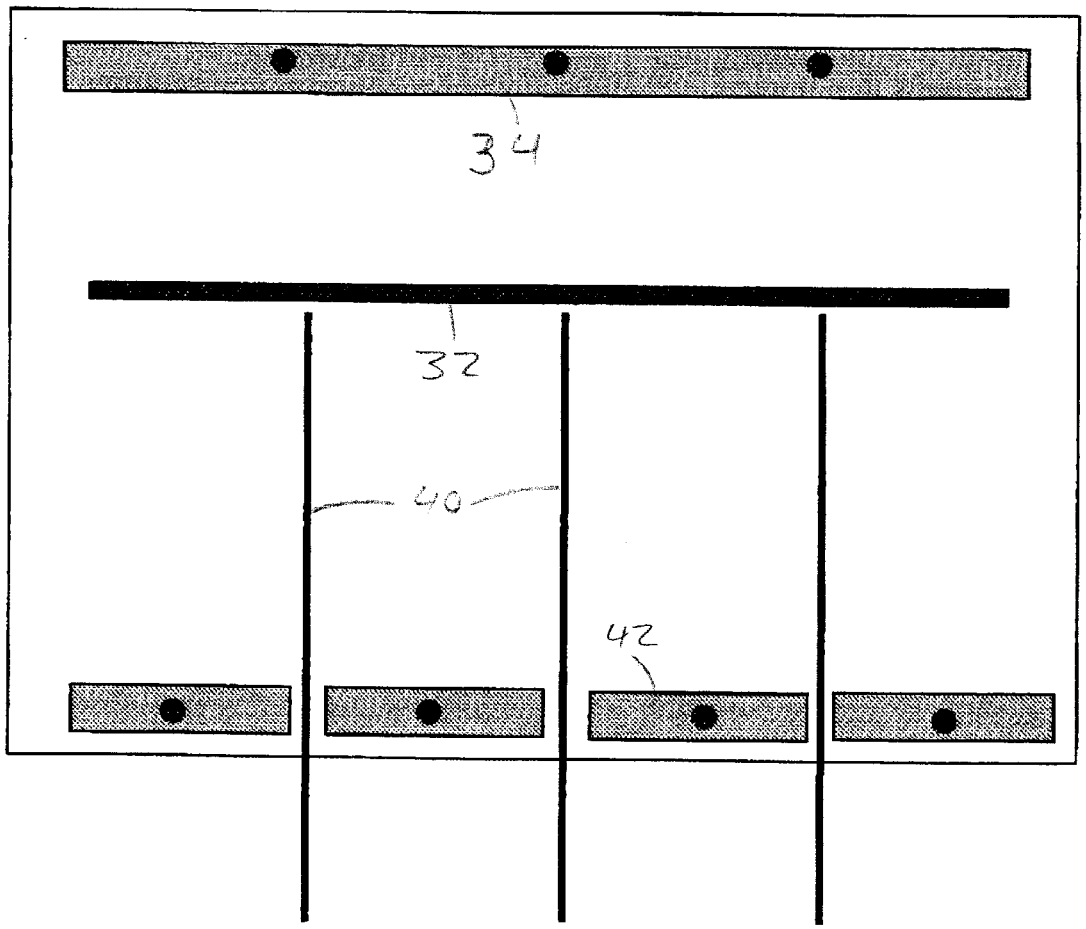
FIG. 4b is a cross-sectional view of a second embodiment of a rapid thermal processing apparatus of this invention.

In an alternative embodiment, illustrated in FIG. 4b, heater 42 includes at least 3 bores which allow passage of support pins 40 extending all the way from the wafer 32, through the heater 42 and out of the chamber. In this embodiment, the pins 40 can be jointly raised or lowered to change the position of the wafer 32 in the chamber.

Figure 5:
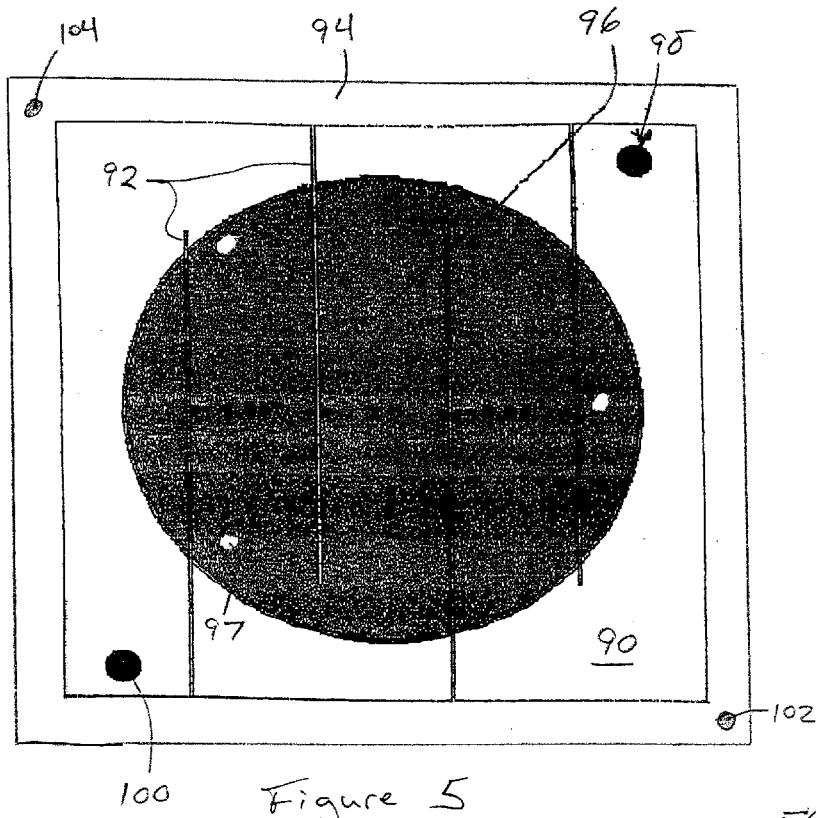
FIG. 5 is an illustration of a silicon carbide resistive heater of this invention.
Figure 6:
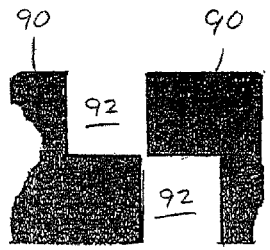
FIG. 6 is a magnified view of offset cuts in the silicon carbide heater shown in FIG. 5.
Figure 7:
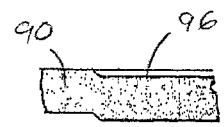
FIG. 7 is a cross-sectional side view of a depressed wafer bed in the silicon carbide heater.

In another alternative embodiment, the heaters 34, 42 are formed of silicon carbide, preferably in monolithic form. A silicon carbide heater of this invention is illustrated in FIGS. 5–7. As shown in FIG. 5, the silicon carbide heater is in the form of a square plate 90. In one embodiment, the square plate has a thickness of 3 mm and a length and width of 10 inches. The square plate 90 is enclosed in a fused silica frame 94. The frame 94 supplies the plate 90 with greater strength.

A series of cuts 92 are machined into the square plate 90 alternating from opposite sides of the plate 90. The cuts 92 create a winding path through which current must flow to traverse the square plate 90, and are illustrated in a side view in FIG. 6. The cuts 92 are machined into both of the planar faces of the square plate 90 in an offset pattern. Use of an offset pattern reduces radiant heat loss through the heater.

In the illustrated embodiment, a half-millimeter depression 96 is machined into a planar face of the square plate 90 to hold a semiconductor wafer. The machined depression 96 is shown, from a cross-sectional side view, in FIG. 7. On the face of the plate 90 opposite the depression, a half-millimeter protrusion is machined to maintain a constant thickness across the plate 90. Within the depression 96, three or more small through-bores are cut to allow fused silica wafer-support pins to pass.

Additional bores are cut into the plate 90 at opposite corners. Electrical connectors 98, 100 are made of SiC graphite (a special grade of graphite with a thermal expansion coefficient approximately equal to silicon carbide) and are coated with chemically vapor deposited silicon carbide. As shown, these connectors 98, 100 are mounted within the bores. The electrical connectors 98, 100 are sized with a cross-section that will generate a resistance at the applied voltage, wherein the resistance will generate heat at a rate which will offset heat loss from the plate 90 through the electrical connectors 98, 100. As a result, the electrical connectors 98, 100 will provide neither a substantial net supply nor loss of heat, and, accordingly, will not substantially affect the temperature of the plate.

Bores are also cut into the frame 94 at the two corners which are unsupported by electrical connectors, and fused silica legs 102, 104 are mounted within these bores to provide added, and more balanced support, for the heater.

Processing steps for which the RTP system of this invention is suitable include resident reactions such as annealing, sintering, silicidation, and glass reflow. The apparatus and methods can also be used to promote surface interactions between the substrate and reactive gases, for example, oxidation and nitridation of the article being processed. Further still, the apparatus and methods of this invention can be used for epitaxial reactions, wherein a material, such as silicon, is deposited in monocrystalline form on a heated substrate. Finally, the apparatus and methods can also be used for chemical vapor deposition, wherein the product of reactant gases is deposited on a heated substrate in noncrystalline form.

Examples of other plasma-sprayed heater applications are as follows:

1. Titanium boride/aluminum oxide blanket heater on pipe with metal contact layer on top and aluminum oxide insulator on the contact.
2. Silicon carbide/aluminum oxide heater tip for natural gas ignitor on kitchen stove, oven, water heater or heating system.
3. Free standing molybdenum disilicide/mullite muffle tube fabricated by sprayforming on a removable mandrel.
4. Low voltage zirconium diboride/aluminum oxide heater coating for bathroom deodorizer.
5. Laboratory Applications: Resistively heated ceramic coated lab vessels; work trays; dissection trays; cell culture ware; glass and plastic ware; tubing; piping; heat exchangers; manifolds; surface sterilizing laboratory hoods; self-sterilizing work surfaces; sterilizing containers; heatable filters; frits; packed beds; sterilizers; autoclaves; self-sterilizing medical bacterial and tissue culture tools (e.g. loops and spreaders); incubators; benchtop heaters; flameless torches; lab ovens; incinerators; furnaces; vacuum ovens; waterbaths; drybaths; heat platens; radiography pen; reaction vessels; reaction chambers; combustion chambers; heatable mixers and impellers; electrophoresis; electropositing; anode and cathode electrodes; heating electrodes; electrolysis and gas generation systems; desalinization systems; de-ionizing systems; spectroscopy and mass spectroscopy; chromatography; HPLC; IR sensors; high temperature probes; thermoplastic bag; cap and tube sealers; thermalcyclers; water heaters; steam generation systems; heated nozzles; heat activated in-line valves; shape-memory alloy/conductive ceramic systems; lyophilizers; thermal ink pens and printing systems;
6. Medical and Dental Applications: Self-sterilizing and self-cauterizing surgical tools (e.g. scalpel blades, forceps); incubators; warming beds; warming trays; blood warming systems; thermally controlled fluid systems; amalgum heaters; dialysis systems; phoresis systems; steamer mops; ultra high temperature incineration systems; self sterilizing tables and surfaces; drug delivery systems (e.g. medicated steam inhaler; thermal activated transcutaneal patches); dermatological tools; heatable tiles; wash basins; shower floors; towel racks; mini-autoclaves; field heater cots; body warming systems; sputtering targets;
7. Industrial applications: Sparkless ignition systems; sparkless combustion engines; bar heaters; strip heaters; combustion chambers; reaction chambers; chemical processing lines; nozzles and pipes; static and active mixers; catalytic heating platform (e.g. scrubbers); chemical processing equipment and machines; environmental remediation systems; paper pulp processing and manufacturing systems; glass and ceramic processing systems; hot air/air knife applications; room heaters; sparkless welding; inert gas welding; conductive abrasives; heated water-jet or liquid-jet cutting systems; heated impellers and mixing tanks; fusion and resistance locks (e.g. Lock works based on resistivity of key); super heated fluorescent bulbs that use new inert gases; heatable valves; heatable interconnects and inter faces of all types; heatable ceramic tiles; self heating circuit boards (e.g self-soldering boards; self-laminating boards); fire hydrant heaters; food processing equipment (e.g. ovens, vats, steaming systems, searing systems, shrink wrapping systems, pressure cooking, boiling, frying, heat sealing systems); in-line food processing equipment; programmable temperature grids and platens to selectively apply heat to 2-D or 3-D structures (e.g. thermoplastic welding and sealing system); point pulsing heaters; battery operated heaters; inscribers and marking systems; static mixers; steam cleaners; IC chip heaters; LCD panel heaters; condensers; de-icing applications (e.g. aerospace); conductive ceramic pens and probes; self-curing glazes; self-baking pottery; walk-in ovens; self-welding gaskets; heat pumps; heat trace systems; heated connectors; fittings; heated pumps; impeelors dairy systems; brewing systems; EDM tooling; electroplating; petroleum processing; heated drills; bits; hard machine tools; parabolic heaters; heated mills and grinding systems; and ink jet heaters and nozzles made out of ceramic to make 3D models where the ceramic nozzles heat and resist abrasion by a polymer or carrier material and ceramic or metal particles that can then be heated to be annealed;
8. Home and office applications: Heatable appliances of all types; self cleaning ovens; ignitors; grills; griddles; nonsusceptor-based heatable ceramic searing systems for microwave ovens; heated mixers; impellers; stirrers; steamers; crock pots; pressure cookers; electric range tops; refrigerator defrost mechanisms; heated ice cream scoops and serving ladles; operated hand held heaters and warmers; water heaters and switches; coffee heater systems; heatable food processors; warmable toilet seats; towel racks; clothes warmers; bodywarmers; cat beds; instantly heated irons; water bed heaters; washers; driers; faucets; heated bathtubs and wash basins; dehumidifiers; hose nozzles for heated washing or steam cleaning; platens to heat moisturized wipes (e.g. Bidettes™); bathroom tissue heaters; towel heaters; heated soap dispensers; heated head razors; evaporative chilling systems; self-heating keys; outdoor CO2 and heat generation biting bug attraction and killing systems (biting bugs are attracted to CO2 and heat); aquarium heaters; bathroom mirrors; chair warmers; heatable blade ceiling fans; floor heaters; laminators;
9. Complex aluminum oxide; ceramic and or metal parts. Plasma sprayed heaters of unusual geometry; variable resistivity heaters allow more heat to be placed in certain heater locations and less heat in other locations; whole surface geometric heaters; direct contact heaters; pure ceramic heating systems; ceramic coated metal heating systems; self-detecting fault systems (e.g. crack in coating increases resistance and heat which shuts down thermal or resistance detection circuit); plasma sprayed thermocouples and sensors; plasma spheredized bed reaction systems (e.g. boron gas generation system for the semiconductor industry; heatable conductive chromatographic beds and bed systems); use of masks to plasma spray heater coating of defined geometry; pre-heaters to instantly warm surfaces prior to less costly or more efficient heating methods; sensors (e.g. heater as part of integrated circuit chip package);

10. Microwave and electromagnetic applications: Magnetic susceptor coatings. Heating energy from induction coil rather than direct applied voltage. Susceptor coated glass and ceramic cooking wear; magnetic induction ovens and range tops;

11. Thermoplastic manufacturing applications: Resistively heated large work surfaces and large heaters; injection molding; tools; molds; gates; nozzles; feed lines; vats; chemical reaction molds; screws; drives; compression systems; extrusion dies; tools; thermoforming; ovens; annealing; welding; heat bonding; molds; moisture cure ovens; vacuum and pressure forming systems; heat sealing; films; laminates; lids; parts; assemblies; hot stamping; shrink wrapping;

12. Automotive applications: Washer fluid heaters; in-line heaters and nozzle heaters; windshield wiper heaters; engine block heaters; oil pan heaters; steering wheel heaters; resistance-based locking systems; microcatalytic convertors; exhaust scrubbers; seat heaters; air heaters; de-icing applications; mirrors; key locks; external lights; plasma sprayed ceramic coating with integral ceramic heater under paint or in place of paint; entry and exit port edges; sparkless ignition systems; combustion engines; spark pistons; sparkless "sparkplugs"; engine applications where heat and wear characteristic of ceramics would be employed (e.g. valves, pistons, bearings); mini-exhaust catalytic pipes; manifold heaters 13. Marine applications: antifouling coatings; de-icable coatings (e.g. railings, walkways, etc.); electrolysis systems; desalinization systems; on-board seafood processing systems; canning; drying; ice drills and corers; survival suits; diving suit heaters (e.g. diving belt weights replaced by batteries); dessication and dehumidifying systems;

14. Defense applications: High temperature thermal targets and decoys; remora heaters; MRE heating systems; weapons preheaters; portable heaters; cooking devices; battery powered heatable knife; noncombustion based gas expansion guns; jet de-icing coating on wings etc; thermal fusion self destruction systems; incinerators; flash heating systems; emergency heating systems; emergency stills; desalinization and sterilization systems;

15. Signage applications: de-icing of road signs; thermoresponsive color changing signs; neon (or other inert gas) impregnated microballoons that fluoresce in magnetic field;

16. Printing and photographic applications: copiers; printers; printer heaters; thermoplastic; wax; thermal cure ink systems; thermal transfer systems; xerographic and printing heaters; radiographic and photographic film process heaters; ceramic printers;

17. Architectural applications: walkway mats; grates; drains; gutters; downspouts; roof edges.

18. Sporting applications: Battery or piezo powered heated golf club heads (better grip with ball); bats; sticks; handgrips; heatable ceramic ice skate edges; ski and snowboard edges; padding; de-icing and re-icing rink systems; goggles; glasses; spectator seats; camping stoves; electric grills; heatable thermos;

19. Transportation systems: rail; air; land (trucking) and aircraft that use these heaters to process materials en route or on site, e.g., on-site incineration from mobile vehicle or trailer; dehumidifying railcar; heated railcars; heated containers.

Figure 8:
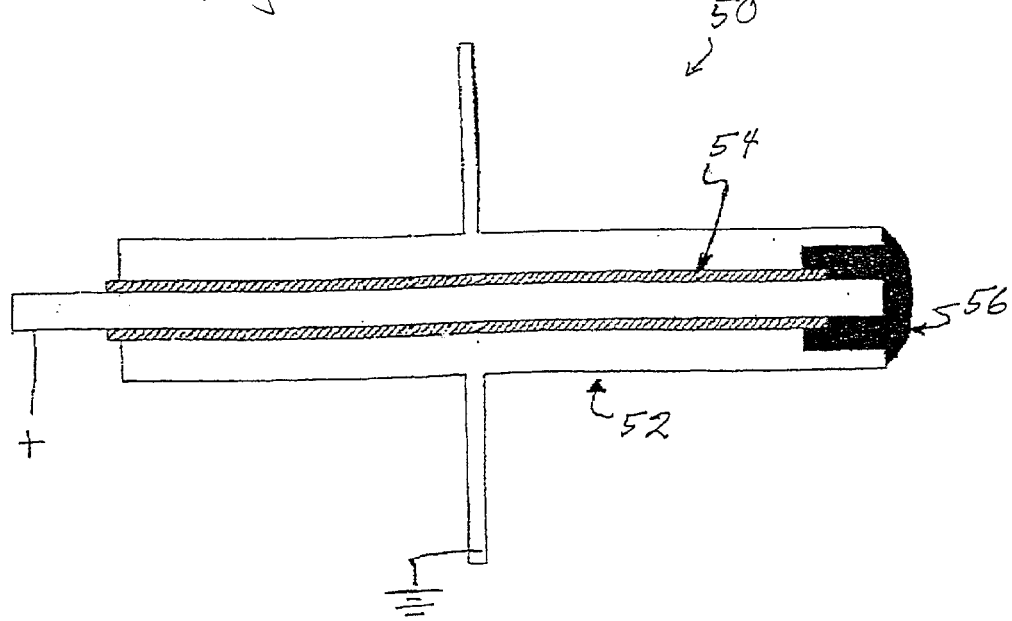
FIG. 8 is a cross-sectional view of a sparkless ignition device in accordance with the invention.

Illustrated in FIG. 8 is a sparkless ignition device 50 including a housing 52 having positive and negative contacts, an insulator coating 54 and a resistive coating 56 on a distal end that is heated to ignite a liquid or gas exposed to the thermal emission.

FIGS. 9a and 9b illustrate a chemically resistant, thermally-sprayed heater pipe for low to high temperature applications. A removable mandrel 110, preferably, of graphite, serves as a base for a sequence of coatings. First, aluminum oxide is arc plasma sprayed onto the mandrel 110 to form an electrically insulating and chemically resistant layer 111. Next, a resistive-heating layer 112 is sprayed onto the aluminum oxide layer 111. The resistive-heating layer 112 can be in the form of a patterned element. An outer aluminum oxide layer 113 is then applied to provide an insulating and chemically-resistant outer barrier. The end of the pipe is masked during the spraying of layer 113, and electrical contacts 114 are then applied to the resistive heating layer 112. The electrical contacts are of a conductive ceramic, metal or composite material and can be applied by sputtering, spraying or mechanical methods. The mandrel is removed by heating it until it is freed by shrinkage or is burned off.

FIG. 10 illustrates a low-temperature heater on a metal or plastic pipe. If the pipe 120 is metal, a layer 121 of insulating material is applied. If the pipe 120 is plastic, a layer 121 of bond coat is applied. Next, a resistive heating layer 122 is applied, followed by an insulating layer 123, which is preferably a polymeric coating. Again, the resistive heating layer 122 is masked at its end when the insulating layer 123 is applied. Electrical contacts 124 are then applied to the resistive heating layer 122 where it was masked. Finally, current leads 124 are attached to the electrical contacts 125.

Figure 11:
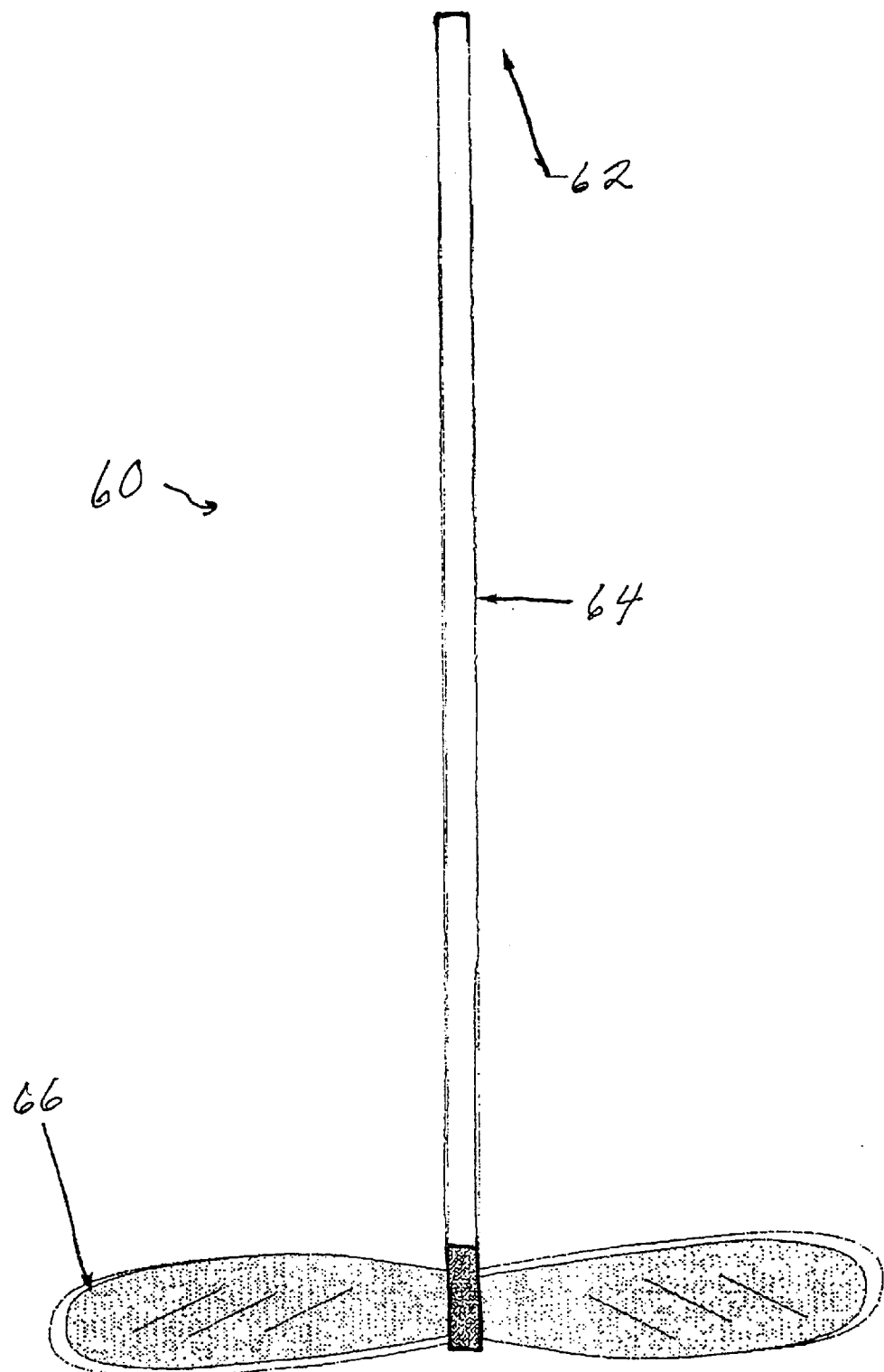
FIG. 11 is an impeller made in accordance with the invention.

In FIG. 11, an impellor 60 is shown with a shaft end 62 that connects to a motor to provide rotation. The shaft 64 has electrical contacts and the impellor element 66 can be a metal base having an insulator, a ceramic resistive coating, sprayed copper contacts and an outer insulation layer. This structure is rapidly heatable, chemically resistant, temperature resistant up in 1200° C. in air or up to 2000° C. in selected atmospheres.

Figure 12:
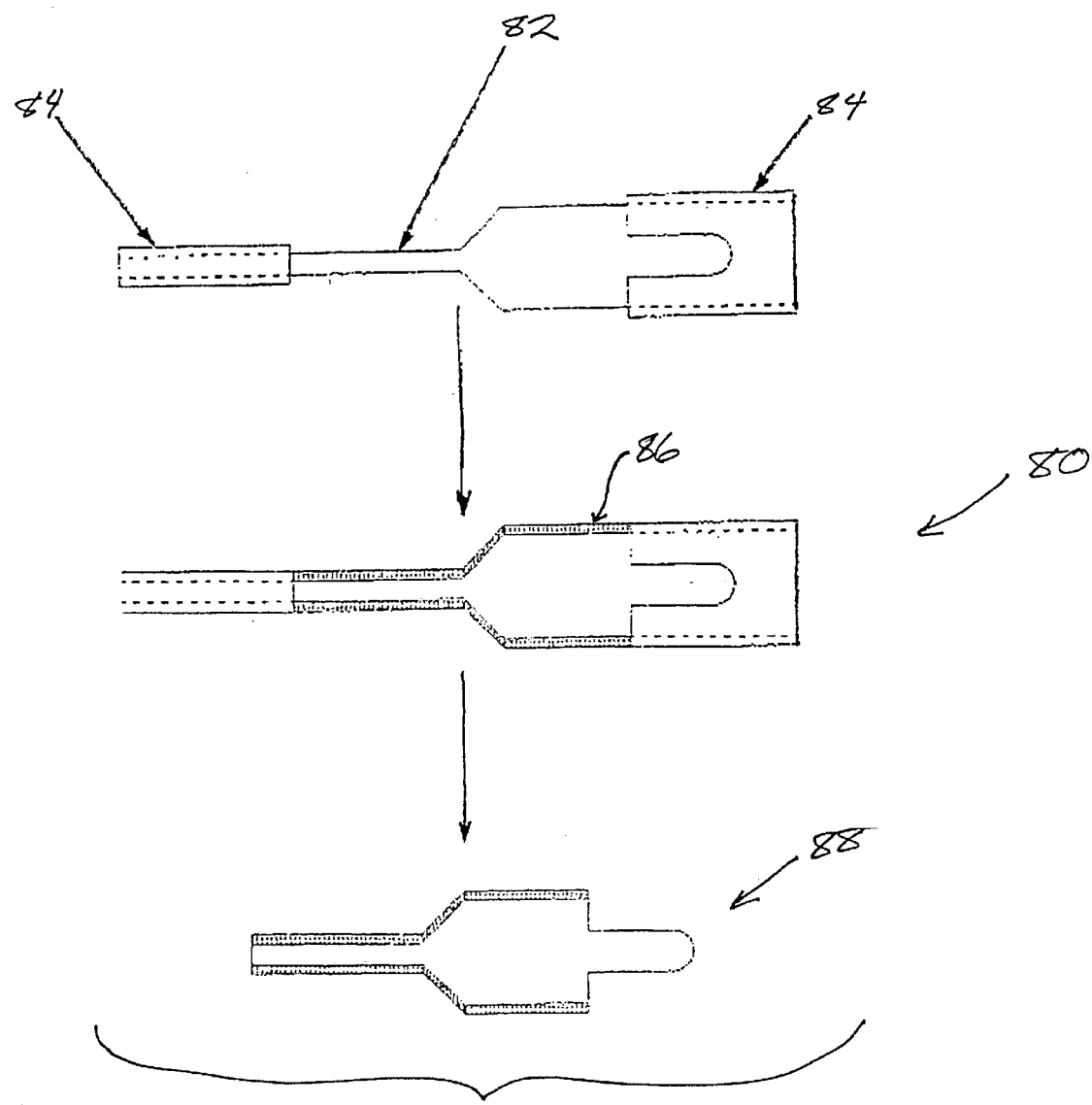
FIG. 12 illustrates a method of making a heated nozzle having a high abrasion resistance.

Shown in FIG. 12 is a method 80 of fabricating an electrically resistive high temperature nozzle. A removable mandrel 82 is provided with a mask 84. The coating 86 as described above is applied and the masks and mandrel are removed at 88. The device can include built-in thermocouples, electrical contacts and connectors for attachment to a fluid supply.

While this invention has been particularly shown and described with references to preferred embodiments thereof, those skilled in the art will understand that various changes in form and details may be made therein without departing from the scope of the invention as defined by the appended claims.

The invention claimed is:

1. A heater comprising at least one thermally sprayed resistive heating layer, wherein said thermally sprayed resistive heating layer comprises a mixture of a first material, a second material, and a third material, wherein said first material is an electrically conducting material, said second material is an electrically insulating material, and said third material alters thermal expansion of said resistive heating layer.

2. The heater of claim 1, further comprising a substrate on which said resistive healing layer is coated.

3. The heater of claim 2, wherein said substrate comprises a conductor, a metal, a ceramic, a plastic, graphite, or a carbon fiber element.

4. The heater of claim 2, wherein said substrate is a pipe, nozzle, impellor, or sparkless ignition device, or is employed in a rapid thermal processing apparatus.

5. The heater of claim 1, further comprising a voltage source coupled to said resistive heating layer.

6. The heater of claim 1, wherein said first material, said second material, or said third material is a ceramic.

7. The heater of claim 6, wherein said first material is a ceramic selected from the group consisting of silicon carbide, molybdenum disilicide, lanthanum chromato, zirconium diborido, titanium diboride, boron carbide, tungsten disilicide, and tin oxide.

8. The heater of claim 6, wherein said second material is a ceramic selected from the group consisting of aluminum oxide, aluminum nitride, and mullite.

9. The heater of claim 6, wherein said third material is a ceramic selected from the group consisting of silicon carbide, molybdenum disilicide, lanthanum chromave, zirconium diboride, titanium diboride, boron carbide, tungsten disilicide, tin oxide, aluminum oxide, aluminum nitride, mullite, silica, yttrium oxide, magnesium zirconate, chromium-doped aluminum oxide, chromium boride, and ceramic fibers.

10. The heater of claim 6, wherein said heater is operable up to 1200° C. in air.

11. The heater of claim 1, wherein said third material is selected from the group consisting of molybdenum, a metal, polystyrene, and platinum.

12. The heater of claim 1, wherein said first material has a positive temperature coefficient of resistivity and said third material has a negative temperature coefficient of resistivity.

13. The heater of claim 12, wherein said first material is titanium diboride and said third material is silicon carbide.

14. The heater of claim 12, wherein said first material is molybdenum disilicide and said third material is lanthanum chromate.

15. The heater of claim 1, wherein said resistive heating layer comprises a plurality of thermally sprayed layers.

16. The heater of claim 1, wherein said thermally sprayed resistive heating layer is a plasma sprayed resistive heating layer.

17. The heater of claim 1, further comprising a thermal barrier layer.

18. The heater of claim 17, wherein said thermal barrier layer comprises zirconium oxide.

19. The heater of claim 1, further comprising a thermal barrier layer disposed between said substrate and said resistive heating layer.

20. The heater of claim 1, furthur comprising a thermal barrier layer, wherein said resistive heating layer is disposed between said thermal barrier layer and said substrate.

21. A method of fabricating at least one resistive heating layer, said method comprising the steps of:
a) mixing a first material, a second material, and a third material, wherein said first material is an electrically conducting material, said second material is an electrically insulating material, and said third material alters thermal expansion of said resistive heating layer; and b) thermally spraying the mixture of step (a) onto a subsfrate, thereby fabricating a resistive heating layer.

22. The method of claim 21, further comprising step (c) removing said resistive heating layer from said substrate.

23. The method of claim 21, further comprising step (c) connecting a voltage source to said resistive heating layer, thereby producing a heater.

24. The method of claim 21, wherein said substrate is a pipe, nozzle, impellor, or sparkless ignition device or is employed in a rapid thermal processing apparatus.

25. The method of claim 21, further comprising the step, before step (b), of forming a bonding layer between said substrate and said resistive heating layer.

26. The method of claim 21, further comprising the step, before step b), of forming an electrically insulating layer between said substrate and said resistive heating layers.

27. The method of claim 21, further comprising step (c) coating said resistive heating layer with a thermal barrier layer, an electrically insulating layer, a thermally emissive layer, or a thermally conductive layer.

28. The method of claim 21, wherein said substrate in step b) is coated with a thermal barrier layer.

29. The method of claim 21, wherein said thermal spraying is plasma spraying.

30. A heater comprising a thermally sprayed resistive heating layer that comprises a mixture of titanium diboride and aluminum oxide.

31. A heater comprising a thermally sprayed resistive heating layer that comprises a mixture of molybdenum silicide and mullite.

32. A heater comprising a thermally sprayed resistive heating layer that comprises a mixture of zirconium diboride and aluminum oxide.

33. A heater comprising a thermally sprayed resistive heating layer that comprises a mixture of a first material, a second material, and a third material, wherein said first material is an electrically conducting material, said second material is an electrically insulating material, and said third material alters a property of said resistive heating layer, wherein said first material has a positive temperature coefficient of resistivity and said third material has a negative temperature coefficient of resistivity.

34. The heater of claim 33, wherein said first material is titanium diboride and said third material is silicon carbide.

35. The heater of claim 33, wherein said first material is molybdenum disilicide and said third material is lanthanum chromate.

36. The heater of claim 33, wherein said property is selected from the group consisting of thermal conductivity, resistivity, thermal emissivity, bonding, hardness, ductility, thermal expansion, porosity, chemical resistance, oxidation resistance, reduction resistance, molten metal resistance, temperature coefficient of resistivity, self-regulating heating, decorative finish, catalytic activity, sintering, reflecflvity, abrasion resistance, strength, sensing capabilities, and filtering properties; and wherein said heater further comprises a thermal barrier layer disposed between said substrate and said resistive heating layer.

37. The heater of claim 33, wherein said property is selected from the group consisting of thermal conductivity, resistivity, thermal emissivity, bonding, hardness, ductility, thermal expansion, porosity, chemical resistance, oxidation resistance, reduction resistance, molten metal resistance, temperature coefficient of resistivity, self-regulating heating, decorative finish, catalytic activity, sintering, reflectivity, abrasion resistance, strength, sensing capabilities, and filtering properties; and wherein said heater further comprises a thermal barrier layer, wherein said resistive heating layer is disposed between said thermal baiter layer and said substrate.

38. A method of fabricating a resistive heating layer, said method comprising the steps of:
   a) mixing a first material, a second material, and a third material, wherein said first material is an electrically conducting material, said second material is an electrically insulating material, and said third material alters a property of said resistive heating layer;
   b) thermally spraying the mixture of step (a) onto a substrate, thereby fabricating a resistive heating layer; and
   c) removing said resistive heating layer from said substrate.

* * * * *

UNITED STATES PATENT AND TRADEMARK OFFICE
CERTIFICATE OF CORRECTION

PATENT NO. : 6,762,396 B2
DATED : July 13, 2004
INVENTOR(S) : Abbott et al.

It is certified that error appears in the above-identified patent and that said Letters Patent is hereby corrected as shown below:

Column 13,
Line 19, change "chromato" to -- chromate --.
Line 20, change "diborido" to -- diboride --.
Line 27, change "chromave" to -- chromate --.

Column 14,
Line 2, change "subsfrate" to -- substrate --.
Line 17, change "layers" to -- layer --.
Line 56, change "reflecflvity" to -- reflectivity --.

Column 15,
Line 5, change "baiter" to -- barrier --.

Signed and Sealed this

Fourteenth Day of December, 2004

JON W. DUDAS
*Director of the United States Patent and Trademark Office*